Jan. 11, 1966 H. F. SHILLING 3,228,643
EASILY INSTALLED INTERCHANGEABLE REAR VISION
MIRROR ASSEMBLY FOR AUTOMOBILES
Filed Oct. 30, 1963 2 Sheets-Sheet 1

INVENTOR.
HARVEY F. SHILLING
BY Roy A. Plant
ATTORNEY

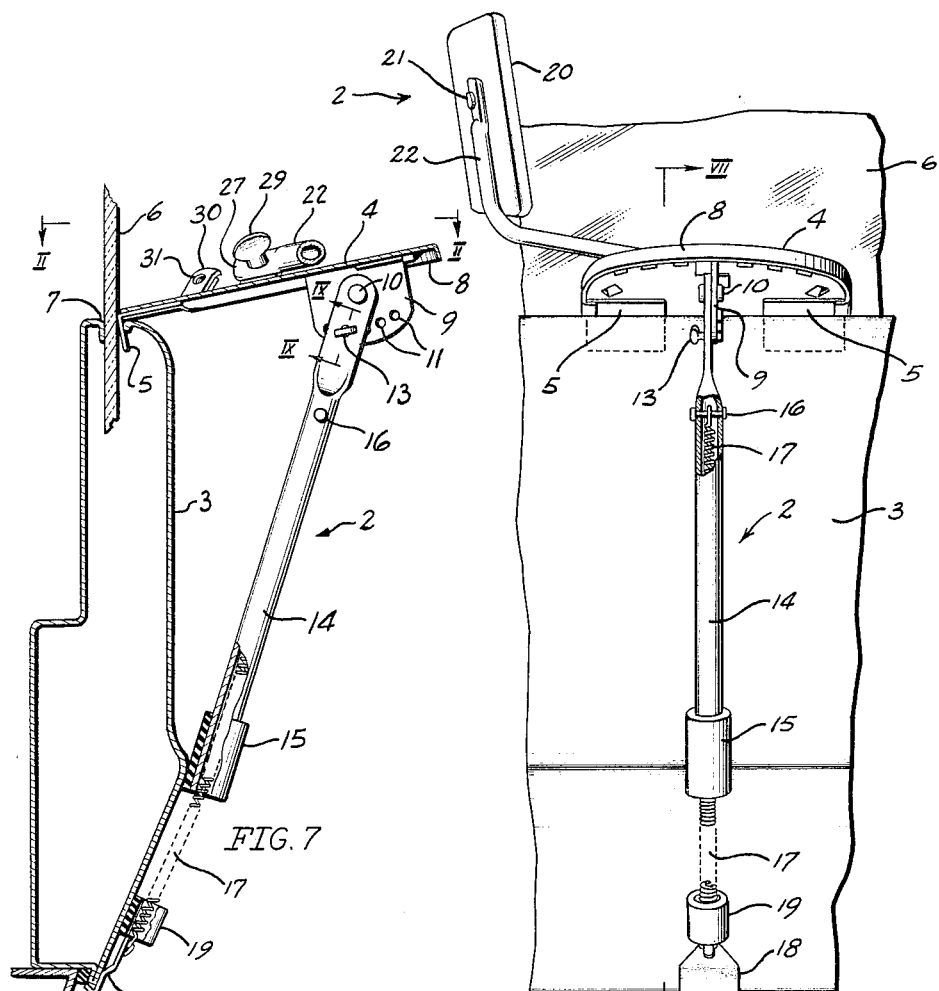
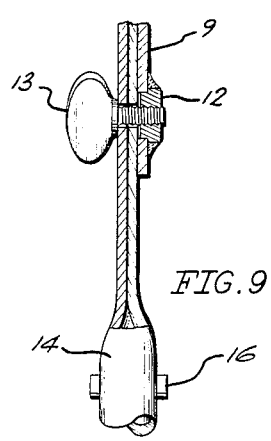
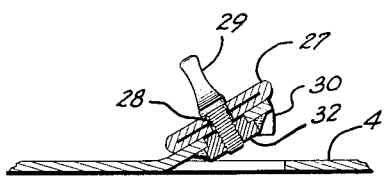
FIG. 7
FIG. 8
FIG. 9
FIG. 10
INVENTOR.
HARVEY F. SHILLING United States Patent Office 3,228,643
Patented Jan. 11, 1966

3,228,643
EASILY INSTALLED INTERCHANGEABLE REAR VISION MIRROR ASSEMBLY FOR AUTOMOBILES
Harvey F. Shilling, Homer, Mich., assignor to Calhoun Industries, Inc., Albion, Mich., a corporation of Michigan
Filed Oct. 30, 1963, Ser. No. 320,060
7 Claims. (Cl. 248—226)

The present invention relates broadly to rear vision mirror assemblies, and in its more specific phases to an outside rear vision mirror with support mechanism making it readily mountable and removable from an automobile door and adapted for use on either side of said automobile.

A great majority of non-commercial automotive passenger vehicles in use today are equipped with outside rear vision mirrors, more commonly on the left or driver's side of same. These rear vision mirrors are mounted on the door or fender of the automotive vehicle, and irrespective of whether one or two of such mirrors are used, the mirror mounting means employed typically comprises a relatively small or short bracket which disposes the mirror itself closely adjacent to the side of the vehicle to permit viewing to the rear of the vehicle without overhang. These outside rear vision mirrors have contributed greatly to the safe operation of non-commercial passenger vehicles for reasons obvious to those acquainted with this art, and especially because they provide a supplemental range of vision to the rear of the vehicle not wholly attainable by the sole use of an inside rear vision mirror.

There is a constantly increasing number of non-commercial passenger vehicles which have occasion to hitch thereto and tow various types of trailers such as, for example, mobile homes, traveling trailers, boat trailers and general hauling trailers which are often of appreciably greater width than the passenger vehicle itself. Under these conditions the operator of the passenger vehicle, where the trailer is higher than the rear vision mirror, is unable to obtain a clear view, if any view at all, of the road behind his vehicle and the trailer which he is hauling.

Under the above conditions, the operator is faced with two alternatives, namely, (1) to tolerate the limited or completely obstructed field of rear vision, a way of operation which is sometimes illegal, or (2) drill holes or supply other means of mounting temporarily on the vehicle body a second rear vision mirror which will project sufficiently outwardly from the side of the vehicle as to provide a clear field of rear vision alongside and to the rear of the towed trailer. Since towing takes place only during a limited portion of the time during which the automotive vehicle is being used, it will be readily apparent that the vehicle operator will want to remove the extending rear vision mirror upon unhitching the trailer, because such extending rear vision mirror is no longer needed, and in any event is relatively unsightly and presents side-clearance problems for the passenger vehicle. One solution to this problem is incorporated in my co-pending U.S. patent application Ser. No. 166,228, filed January 15, 1962, now U.S. Patent No. 3,114,530, for a "Quick Detachable Rear View Mirror Assembly for Automobiles." The present invention was devised to overcome the noted problems, and to provide an improvement over the invention set forth in my noted co-pending patent application.

Accordingly, among the objects of the present invention is the provision of an extended auxiliary outside rear vision mirror having a support mechanism which may be readily mounted on the outside of an automotive vehicle front door for use while towing a trailer, and yet which may be readily removed from such vehicle door when the trailer is unhitched from same, and wherein no changes to the door are necessary in the use of such auxiliary outside rear vision mirror on either side of the automotive vehicle.

Another object of this invention is to provide a highly simplified and versatile extended auxiliary outside rear vision mirror which can be quickly attached and detached from an automotive passenger vehicle without damage to the latter, or the use of tools.

A further object of the present invention is to provide an extended auxiliary outside rear vision mirror which is so constructed as to be attachable to either side of a commercial or non-commercial automotive passenger vehicle having a pair of front doors and to be adjustable for rear viewing without the use of added or substituted parts which would change the assembly from right-hand to left-hand construction and vice versa.

Still further objects and advantages of this invention will appear as the description proceeds.

To the accomplishment of the foregoing and related ends, the invention, then, consists of the extending rear vision mirror means for automotive vehicles as will be hereinafter fully described and particularly pointed out in the claims, the annexed drawings and the following description setting forth in detail certain means for carrying out the invention, such disclosed means illustrating however, but several of various ways in which the principle of the invention may be used.

In the annexed drawings:

FIGURE 1 diagrammatically shows in front elevation an automotive vehicle having the left and right front doors of same equipped with a preferred embodiment of the present invention.

FIGURE 7 is an enlarged fragmentary sectional side elevational view of a preferred form of the present invention as taken along line VII—VII of FIGURE 8, looking in the direction of the arrows.

FIGURE 8 is an enlarged fragmentary and partially sectioned front elevational view of the assembly shown in FIGURE 7.

FIGURE 9 is an enlarged fragmentary sectional view as taken along the line IX—IX of FIGURE 7, looking in the direction of the arrows.

FIGURE 10 is an enlarged fragmentary sectional view as taken along the line X—X of FIGURE 2, looking in the direction of the arrows.

Figure 1:
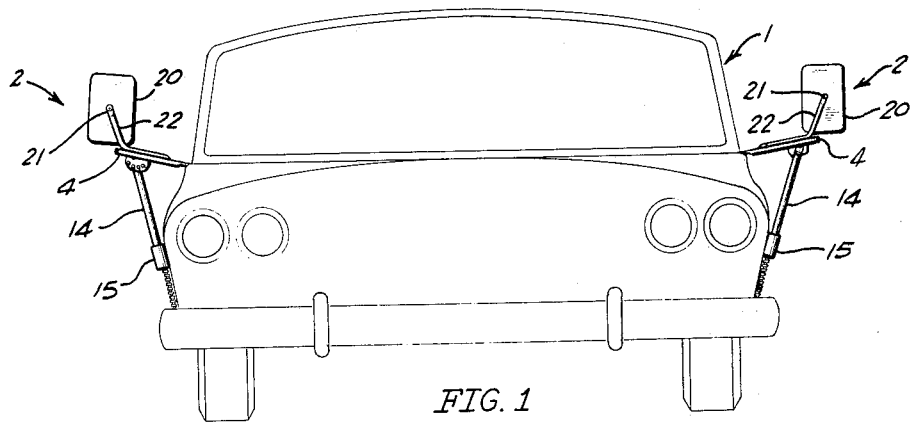

Referring more particularly to FIGURE 1 of the drawings it will be noted that the passenger automobile 1 has a pair of sidewise extended outside rear vision mirror assemblies 2 which are detachably mounted on the automobile doors 3, and as will be hereinafter explained, such rear vision mirror assemblies 2 are so constructed that, without additional parts, they will operably fit either side of the passenger automobile.

A preferred form of the sidewise extending rear vision mirror assembly 2 is shown both in FIGURE 1 and in the enlarged fragmentary assembly views of FIGURES 7 and 8. Here it will be noted there is provided a mounting plate 4 having a door engaging hook edge means 5 which engages and extends into the glass 6 receiving opening 7 in the door 3 while the other edges of said mounting plate 4 are preferably provided with a downturned flange edge 8 for stiffening same without use of excessively heavy gauge metal. On the central outer portion of the underface of mounting plate 4 there is conventionally anchored, as by welding or riveting, a downwardly extending connecting plate 9 which is substantially perpendicular to mounting plate 4 as well as the side of the automobile when the rear vision assembly is mounted in place. This plate 9 carries a pivot means 10, and a series of small openings 11 in semi-circular pattern centered on pivot means 10. These openings 11 are preferably the threaded portion of a series of nuts 12 welded in place, FIGURE 9, on connecting plate 9 in a common plane ready for the reception of a thumbscrew 13, or the like, to clamp pivoted support arm 14 in various fixed angular positions to connecting plate 9, FIGURES 7 and 8.

The support arm 14 is flattened at one end, FIGURES 7, 8 and 9, and suitably perforated for the reception of pivot means 10 and thumbscrew 13, while its other end is open and provided with an external cushioning means such as rubber sleeve 15, or the like, to bear against the outer face of the automobile door 3 and minimize chafing injury to same. Adjacent the flattened end of support arm 14, but spaced a short distance from same is a pin or rivet 16 on which is hooked one end of an elongated tension spring 17 which extends through a major portion of the length of support arm 14 and out of the open lower end of same. Mounted on the lower end of spring 17 is a door bottom engaging hook 18 with a second cushioning means such as rubber sleeve 19 on said spring adjacent said hook 18 to protect the bottom portion of the door 3 from being chafed and injured by said spring 17 and hook 18. This spring 17, with its hook 18, has to be stretched moderately to engage the hook with the bottom edge of door 3 to hold the assembly 2 in fixed position under normal conditions of use. The adjustability of support arm 14, and the stretchability of elongated tension spring 17 makes the assembly very versatile in fitting various size front doors of automotive vehicles such as automobiles.

The rear vision mirror 20 is conventionally mounted by a universal pivot means 21 on the outer end of a supporting arm 22, with such pivot means preferably permitting rearward viewing from either side of said arm. This outer end of supporting arm 22 is preferably turned up as shown for ease of adjusting the mirror 20 for unobstructed rearward viewing by the automobile driver. The main portion of supporting arm 22 extends along the upper surface of mounting plate 4 to which it is connected as will now be described.

Figure 6:
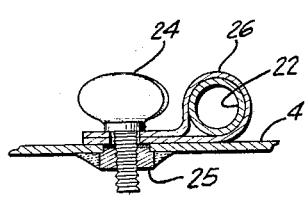
FIGURE 6 is an enlarged fragmentary sectional view as taken along line VI—VI of FIGURE 2, looking in the direction of the arrows.

Mounting plate 4 is provided, preferably in a semi-circular pattern adjacent the outer edge of same, with a series of openings 23 which are threaded for the reception of a thumbscrew 24, or the like. These openings 23 also are preferably the threaded holes in nuts 25 which may be welded or brazed in place on the under side of mounting plate 4, FIGURES 3 and 6, to give a strong and stable anchor for thumbscrew 24. A clip 26, FIGURES 2 and 6, is held by thumbscrew 24 on mounting plate 4, and this clip 26, in turn, slidably fits and holds supporting arm 22 in various adjusted positions depending largely upon which of the openings 23 the thumbscrew 24 is used to anchor clip 26.

Figures 2, 3:
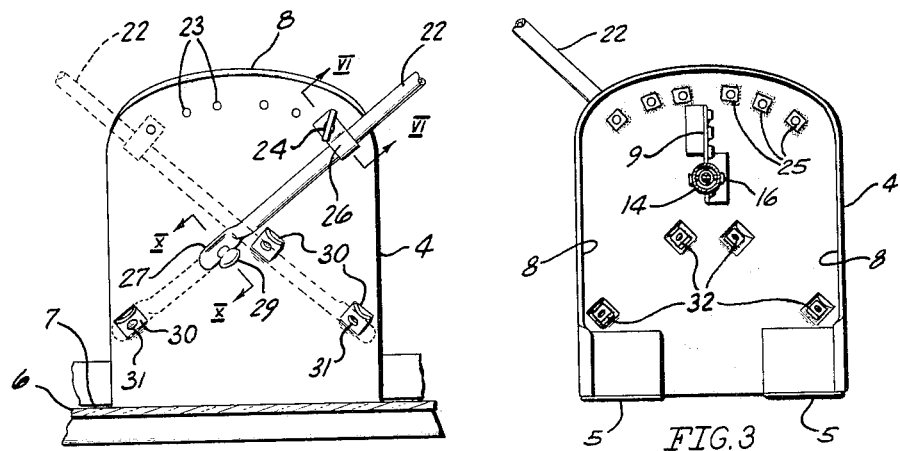
FIGURE 2 is an enlarged fragmentary top view of a rear vision mirror support mechanism constructed in accordance with the present invention as seen along line II—II of FIGURE 7, looking in the direction of the arrows.
FIGURE 3 is an enlarged fragmentary bottom view of the rear vision mirror support mechanism shown in FIGURE 2.

While supporting arm 22 has a rear vision mirror on its outer end, its other end 27, FIGURE 2, is flattened and slightly offset, and perforated at 28, FIGURE 10, for the reception of a thumbscrew 29. Mounting plate 4 is provided with at least two and preferably four projections 30 located substantially at the points shown in FIGURES 2 and 3, and with each of them provided with an opening 31 which is preferably threaded for engagement with thumbscrew 29. One way of satisfactorily supplying these threads is to weld or braze a nut 32 on the under side of each projection 30, as shown in FIGURES 3 and 10. With the projections 30 rounded as shown, this facilitates adjusting the angular position of the mirror supporting arm 22 depending upon which opening 23 is engaged by thumbscrew 24 which anchors clip 26 in place. By having more than two projections 30, for instance four as shown in FIGURE 2, this permits two outward projection adjustments to be made for the mirror 20, for either right or left mounting of the assembly 2, in addition to the adjustment which may be made due to varying the angular settings of supporting arm 22 by use of different openings 23 in the fastening of clip 26, carrying arm 22, by means of thumbscrew 24.

Figure 4:
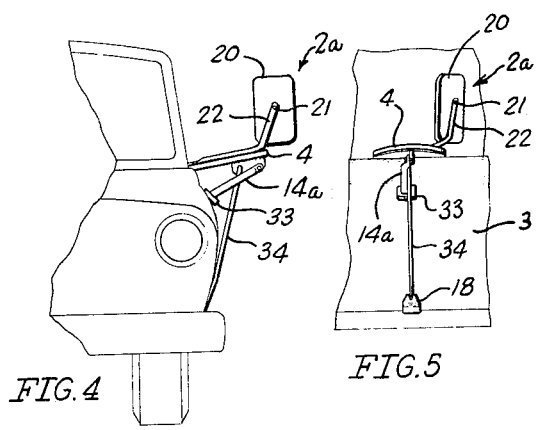
FIGURES 4 and 5 are respectively front and side elevational views of a modified form of the present invention.
Figure 5:
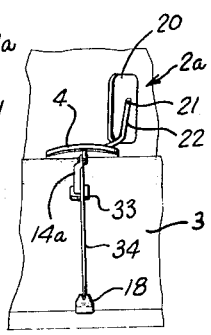

In the alternate or modified construction shown in FIGURES 4 and 5, the arm 14a is similar to arm 14, FIGURE 1, except that it is shorter and provided with a suitably cushioned face foot 33 for resting against the side of the automotive vehicle or passenger automobile 1 without chafing or marring same in conventional use. The mounting of the upper end of arm 14a is to be considered to be diagrammatically similar to the mounting of arm 14 shown in FIGURES 7 and 8. A resilient or elastic means 34 is conventionally connected to mounting plate 4 adjacent the outer edge of same, as diagrammatically illustrated in FIGURES 4 and 5, while its lower end is provided with a door bottom engaging hook 18. This resilient or elastic means 34 is of a length such that it can be readily stretched to permit operable hooking of hook 18 on the bottom of the door 3 to stabilize the assembly ready for adjustment and use.

It is thus to be seen that the sidewise extended rear vision mirror assembly of either the FIGURE 1 or FIGURE 4 type may be quickly hooked on the automotive vehicle door, either right or left, and adjusted for vision to the rear past a trailer or the like, and upon arrival at destination same may be simply unhooked from the vehicle door and stored until needed the next time, all without drilling holes or otherwise altering the automotive vehicle on which the assembly is to be used.

While but two forms of the invention have been shown and described, it will be seen that advantageous provision has been made for carrying out the invention. Therefore, the embodiments shown in the drawings are merely for illustrative purposes, and are not intended to limit the spirit and scope of the invention set forth. Directional terms such as "right hand," "left hand," "sidewise," "downturned," "bottom," "outer," "upper," "lower," et cetera, have also been used to facilitate describing the rear vision mirror assembly in the position shown in the drawings, and accordingly are not to be considered as limiting upon the invention.

Other modes of applying the principle of my invention may be employed instead of those explained, change being made as regards the outside rear vision mirror support mechanism herein disclosed, provided the means stated by any of the following claims or the equivalent of such stated means be employed.

I therefore particularly point out and distinctly claim as my invention:

1. An outside rear vision mirror support mechanism adapted to be removably mounted on the exterior of a vehicle door of the type having a window sill and a bottom edge of said door spaced below said window sill, said support mechanism comprising a mounting plate engageable with and removably mountable on said window sill, a brace member, means connecting the upper end of said brace member to said mounting plate in position permitting the lower end of said brace member to engage said door below said mounting plate, said connecting means including a downwardly extending means carried by said mounting plate, said downwardly extending means having both a fixed location pivot connecting the end of said brace member to same and a separate means spaced from said pivot for anchoring said brace member in a predetermined angular relation to said mounting plate, a stretchable resilient member, means joining said stretchable resilient member to said mounting plate in position to facilitate the lower portion of said brace member resting against the side of said door, a retaining means connected to the extending end of said stretchable resilient member and removably engageable with said bottom edge of said door to place said stretchable resilient member in tension with said mounting plate engaged with said window sill and said brace member resting against said door, a rear vision mirror, a supporting arm for said rear vision mirror, and means for mounting said supporting arm on said mounting plate with said rear vision mirror in operable rear viewing position, wherein said downwardly extending means connecting upper end of said brace member to said mounting plate is in the form of a downwardly extending plate member carrying said fixed location pivot and said separate means spaced from said pivot for anchoring said brace member in various operable fixed positions relative to said mounting plate, said downwardly extending plate member being substantially perpendicular to both said mounting plate and the exterior of said vehicle door.

2. An outside rear vision mirror support mechanism adapted to be removably mounted on the exterior of a vehicle door of the type having a window sill and a bottom edge of said door spaced below said window sill, said support mechanism comprising a mounting plate engageable with and removably mountable on said window sill, a brace member, means connecting the upper end of said brace member to said mounting plate in position permitting the lower end of said brace member to engage said door below said mounting plate, a stretchable resilient member, means joining said stretchable resilient member to said mounting plate in position to facilitate the lower portion of said brace member resting against the side of said door, a retaining means connected to the extending end of said stretchable resilient member and removably engageable with said bottom edge of said door to place said stretchable resilient member in tension with said mounting plate engaged with said window sill and said brace member resting against said door, a rear vision mirror, a supporting arm for said rear vision mirror, and means for mounting said supporting arm on said mounting plate with said rear vision mirror in operable rear viewing position, wherein said mounting plate has means for fastening the end of said supporting arm, which is remote from said mirror, in various positions thereon, and wherein said supporting arm and mounting plate have means intermediate said fastened end of said supporting arm and said mirror for anchoring said supporting arm in various fixed positions on said mounting plate.

3. An outside rear vision mirror support mechanism adapted to be removably mounted on the exterior of a vehicle door of the type having a window sill and a bottom edge of said door spaced below said window sill, said support mechanism comprising a mounting plate engageable with and removably mountable on said window sill, a brace member, means connecting the upper end of said brace member to said mounting plate in position permitting the lower end of said brace member to engage said door below said mounting plate, a stretchable resilient member, means joining said stretchable resilient member to said mounting plate in position to facilitate the lower portion of said brace member resting against the side of said door, a retaining means connected to the extending end of said stretchable resilient member and removably engageable with said bottom edge of said door to place said stretchable resilient member in tension with said mounting plate engaged with said window sill and said brace member resting against said door, a rear vision mirror, a supporting arm for said rear vision mirror, and means for mounting said supporting arm on said mounting plate with said rear vision mirror in operable rear viewing position, wherein said means connecting the upper end of said brace member to said mounting plate includes a downwardly extending member, pivot means joining the upper end of said brace member to said downwardly extending member in position for pivotal movement of said brace member to and from said vehicle, means for anchoring said brace member to said downwardly extending member in various operable fixed positions relative to said door, means on said mounting plate for fastening the end of said supporting arm, which is remote from said mirror, in various positions thereon, and means on said supporting arm and mounting plate, intermediate said fastened end of said supporting arm and said mirror, for fastening said supporting arm in various fixed positions on said mounting plate.

4. An outside rear vision mirror support mechanism adapted to be removably mounted on the exterior of a vehicle door of the type having a window sill and a bottom edge of said door spaced below said window sill, said support mechanism comprising a mounting plate engageable with and removably mountable on said window sill, a brace member, means connecting the upper end of said brace member to said mounting plate in position permitting the lower end of said brace member to engage said door below said mounting plate, a stretchable resilient member, means joining said stretchable resilient member to said mounting plate in position to facilitate the lower portion of said brace member resting against the side of said door, a retaining means connected to the extending end of said stretchable resilient member and removably engageable with said bottom edge of said door to place said stretchable resilient member in tension with said mounting plate engaged with said window sill and said brace member resting against said door, a rear vision mirror, a supporting arm for said rear vision mirror, and means for mounting said supporting arm on said mounting plate with said rear vision mirror in operable rear viewing position, wherein said stretchable resilient member is in the form of tension spring, and wherein said means connecting the upper end of said brace member to said mounting plate includes a downwardly extending substantially flat member which is generally perpendicular to said vehicle door, means joining the upper end of said brace member to said downwardly extending member, adjacent said mounting plate, in position for pivotal movement of said brace member to and from said vehicle, threaded means, spaced from said pivot means, for anchoring said brace member to said downwardly extending substantially flat member in various operable fixed positions relative to said door, threaded means on said mounting plate for fastening the end of said supporting arm, which is remote from said mirror, in various positions thereon, a clip on said supporting arm and a threaded means on said mounting plate, intermediate said fastened end of said supporting arm and said mirror, and a threaded member for fastening the clip on said supporting arm in various fixed positions to the threaded means on said mounting plate.

5. An outside rear vision mirror support mechanism adapted to be removably mounted on the exterior of a vehicle door of the type having a window sill and a bottom edge of said door spaced below said window sill, said support mechanism comprising a mounting plate engageable with and removably mountable on said window sill, a hollow tubular member, means connecting the upper end of said hollow tubular member to said mounting plate, a stretchable resilient means extending through said tubular member with one end thereof connected to said tubular member, the other end of said stretchable resilient means extending out of the lower end of said tubular member, a retaining means connected to the extending end of said stretchable resilient means and removably engageable with said bottom edge of said door to place said stretchable resilient means in tension with said mounting plate engaged with said window sill and said tubular member resting against said door, a rear vision mirror, a supporting arm for said rear vision mirror, and means for mounting said supporting arm on said mounting plate with said rear vision mirror in operable rear viewing position.

6. An outside rear vision mirror support mechanism as set forth in claim 5, wherein said means connecting the upper end of said hollow tubular member to said mounting plate includes a downwardly extending member, pivot means joining the upper end of said tubular member to said downwardly extending member in position for pivotal movement of said tubular member to and from said vehicle door, and means for anchoring said tubular member to said downwardly extending member in various operable fixed positions relative to said door.

7. An outside rear vision mirror support mechanism as set forth in claim 5, wherein said mounting plate has means for anchoring the end of said supporting arm remote from said mirror in various positions thereon, and wherein said supporting arm and mounting plate have means intermediate said pivot and said mirror for anchoring said supporting arm in various fixed positions on said mounting plate.

References Cited by the Examiner
UNITED STATES PATENTS

| | | | |
|---|---|---|---|
| 1,007,590 | 10/1911 | Miller | 248—282 X |
| 1,290,252 | 1/1919 | Lester et al. | 248—276 X |
| 2,309,772 | 2/1943 | Karger | 248—82 |
| 2,518,538 | 8/1950 | Giblin | 248—226 X |
| 2,626,771 | 1/1953 | Krohm | 248—226 |
| 2,632,363 | 3/1953 | Persson | 88—93 |
| 3,142,469 | 7/1964 | Clemmer | 248—226 |

CLAUDE A. LE ROY, *Primary Examiner.*

K. J. WINGERT, *Assistant Examiner.*